3,285,562
ADJUSTABLE ELASTIC SUPPORT FOR SEATS, PARTICULARLY IN VEHICLES
Alfred Langer, Solingen, Germany, assignor to Bremshey & Co., Solingen-Ohligs, Germany, a partnership firm of Germany
Filed Jan. 12, 1965, Ser. No. 424,939
Claims priority, application Germany, Jan. 28, 1964, B 56,112
3 Claims. (Cl. 248—399)

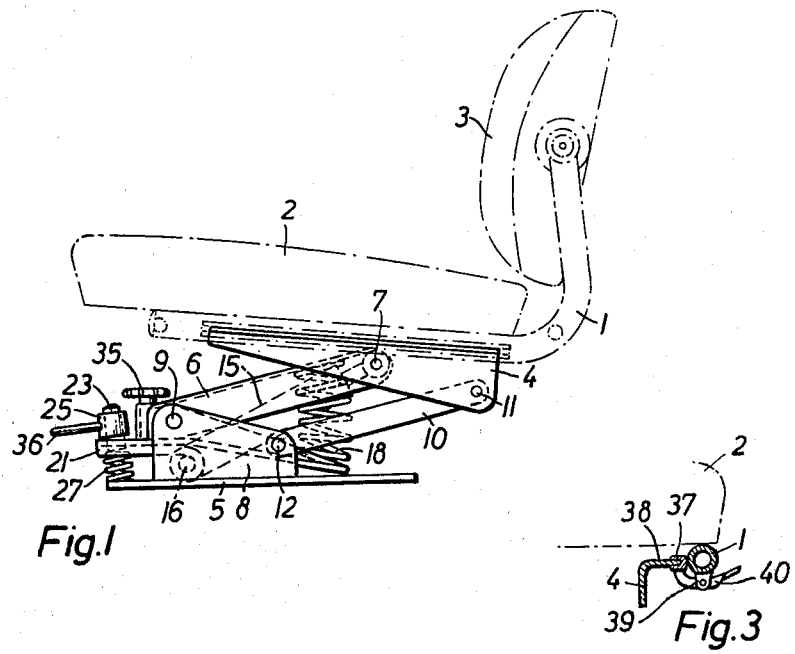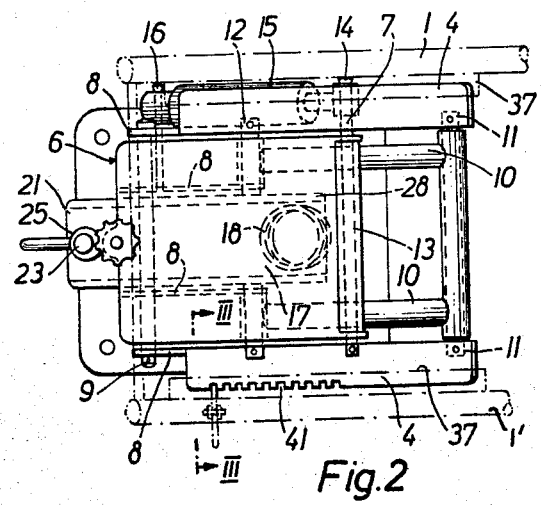

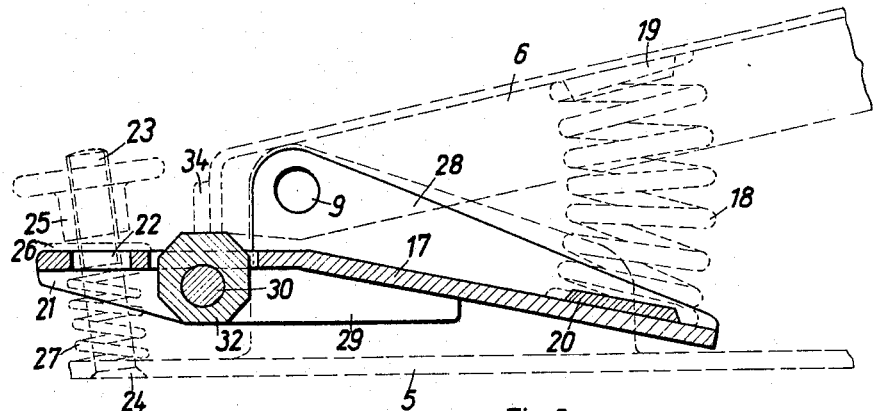
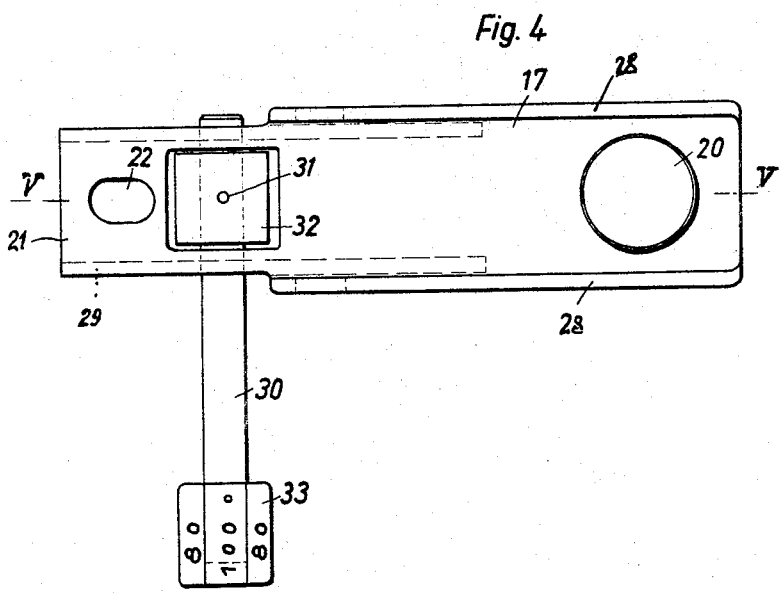

My invention relates to adjustable elastic supports for seats primarily in automotive vehicles and more particularly to supports of said kind comprising a spring controlled parallelogram linkage which articulately connects a seat supporting frame to a base.

The known supports of said type are quite complicated in construction, comprise a great number of movable elements and of joints requiring attention, and can not be easily adjusted to different drivers and to changing road conditions.

It is a principal object of my invention to provide a support which avoids the said and other disadvantages. According to my invention, I associate with the said parallelogram linkage a control lever which extends rearwardly in relation to the seat and is swingably mounted in the base of the support in an adjustable angular relation thereto, and I mount spring means between said control lever and the seat frame or intermediate frame or any part connected therewith, for example between said control lever and a member of said parallelogram linkage thus by changing said angular relation of the control lever, the prestress of the spring means may be easily varied as required.

The said and other objects of my invention will be more fully understood from the following specification when read with the accompanying drawing in which FIGS. 1 and 2 show a side view and a top view, respectively, of an embodiment of my new support for seats in its initial position i.e. prior to the loading of the seat, FIG. 3 shows a section along line III—III of FIG. 2, and FIGS. 4 and 5 show in a larger scale, respectively, a top view and a sectional view taken along line V—V of FIG. 4 of a modified control means used to adjust the prestress of the spring means in my new support.

The same reference numerals indicate the same or equivalent elements in all figures.

The seat shown in dotted lines in FIG. 1 to which my new support is applied comprises a conventional tubular frame 1 provided with a seat cushion 2 extending between parallel side arms 1' of the frame and with a back rest 3. The said side arms 1' are over intermediate sustaining members or sub-frame such as two parallel angular bars 4, namely a righthand and a lefthand bar as seen by an occupant of the seat, linked to a base or bed member 5 by a parallelogram linkage including a rockable forward link member 6 having the shape of a downwardly open box and of a rockable rear link member consisting of a pair of link rods 10. The forward link member 6 is at its upper end 13 hinged to an axle 7 and jointed with its lower end to the axle 9 which rests in upstanding cheeks 8 of the base 5. The link rods 10 constituting the rear link member are jointedly connected to the angular bars 4 by means of the axle 11 and to the base 5 by pivots 12 resting in said cheeks 8. The axle 9 is preferably located higher than the pivots 12 to hold the sustaining members 4 and thus the seat in a slightly rearwardly inclined position as shown in FIG. 1.

As appearing from FIGS. 2 and 3 the frame arms 1' are provided with U-shaped slides 37 which embrace and are displaceable on flanges 38 of the angular sustaining members 4. One of said flanges 38 is provided with a toothing 41 which is engaged by the end of one arm of a two-armed lever 40 tiltably resting in an eye 39 on the frame arm 1'. By means of the manually operable lever 40, which is held in engagement with said toothing by a not shown spring, the position of the seat frame 1 can be adjusted.

The axle 7 comprises an extension 14 which serves to operate a shock absorber 15 tiltably mounted on a pivot 16 projecting from the neighboring cheek 8. It will be understood that pivot 16 has to be downwardly offset relative to axle 9 to mount the shock absorber operationally.

The axle 9 supports in its middle portion a two-armed control lever having a longer arm 17 and a shorter arm 21. Between the said longer lever arm 17 and the seat sustaining member 4 or any part associated therewith such as the forward link member 6 is a helical spring 18 secured in upstanding position by circular projections 19 and 20 illustrated in FIG. 5. The shorter lever arm 21 is provided with an opening 22 through which passes a spindle 23 extending from the base 5. A check nut 25 engages the threaded end of spindle 23 and permits to positionally adjust the double armed lever 17–21 and thereby to control over spring 18 the highest elevational position of the not loaded seat assembly relative to the base 5. The check nut 25 may be operated with the help of an attached lever 36 possibly on the principle of a ratch gear (FIGS. 1 and 2). A spring 27 surrounding the spindle 23 between the base 5 and lower lever arm 21 will prevent the latter from disengaging the check nut 25 when driving shocks occur while the seat is not loaded. An adjusting screw 35 mounted on the forward link member 6 and abutting with its lower end the shorter lever arm 21 serves to adjust the angular relation of the longer lever arm 17 and the link member 6 and thus of the prestress of spring 18 thereby controlling the position of the not loaded seat assembly.

In the modification shown in FIGS. 4 and 5 the double armed lever 17–21 has substantially an H-profile with upstanding flanges 28 engaged by the axle 9 and downwardly directed flanges 29 rotatably holding a shaft 30. A multilateral for example octagonal prismatic body 32 is eccentrically secured to said shaft 30 so that it will, when turned, extend in different extents partially upwardly through another opening in lever arm 21. The shaft 30 is extended beyond one flange 29 as shown in FIG. 4 and holds another conformingly shaped multilateral prismatic body 33 in a position symmetrical to that of body 32. This other body 33 serves as means for manually turning shaft 30 with body 32. The differently positioned side faces of prismatic body 32 cooperate alternately with a limit stop or shoulder 34 of the forward link member 6 and adjustably limit the upward swing movement of this link member 6 relative to the lever arm 17; thus the prestress of spring 18 may be controlled. The degree of the desired prestress of spring 18 may be read from indications appearing on the side faces of body 33.

In all figures the control lever arm 17 is shown in its most depressed position conforming to the lowest initial elevations of the unloaded seat. This initial elevation may be increased by raising the lever arm 17 i.e. by depressing the other lever arm 21 by means of the check nut 25.

While specific embodiments of my invention have been shown and described in detail to illustrate the application of the principles of my invention, it will be understood that my invention may be otherwise embodied without departing from such principles.

What I claim as my invention:

1. Adjustable elastic support for a seat frame, particularly in automotive vehicles comprising in combination a base; a seat frame; a parallelogram linkage articulately connecting said base and the seat frame to support the latter in different elevational positions; a rearwardly extending control lever having a longer rearward and a shorter forward arm tiltably mounted in said base into adjustable angular positions relative thereto; suspension spring means operatively interposed between the rearward arm of said control lever and said seat frame; adjusting means associated with the base to control the inclination of the control lever relative to the base and thus to adjust the elevation of the seat frame when the same is unloaded; and stop means associated with the parallelogram linkage and for adjustable cooperation with said control lever to changeably limit the upward movement of the seat frame and thus to control the prestress of the spring means while the seat is not loaded.

2. An adjustable elastic support according to claim 1 wherein the said stop means comprise a multilateral prismatic body eccentrically and rotatably mounted in the forward arm of the control lever so that in radial direction differently extending portions thereof reach above the upper surface of the control lever arm and means firmly associated with the parallelogram linkage for engagement with one of the faces of the prismatic body.

3. An adjustable elastic support according to claim 1 wherein said stop means are an adjusting screw mounted in the parallelogram linkage.

References Cited by the Examiner

UNITED STATES PATENTS

| | | | |
|---|---|---|---|
| 3,031,164 | 4/1962 | Schopf | 248—373 |
| 3,085,778 | 4/1963 | Korn | 248—399 |
| 3,203,661 | 8/1965 | Brendel | 248—399 |

FOREIGN PATENTS

| | | |
|---|---|---|
| 1,285,459 | 1/1962 | France. |
| 930,903 | 7/1963 | Great Britain. |

CLAUDE A. LE ROY, *Primary Examiner.*

R. P. SEITTER, *Assistant Examiner.*